United States Patent Office 3,678,007
Patented July 18, 1972

3,678,007
METAL SALT COMPLEXES OF IMIDAZOLIUM SALTS AS CURING AGENTS FOR ONE PART EPOXY RESINS
Rostyslaw Dowbenko and Carl C. Anderson, Gibsonia, Pa., assignors to PPG Industries, Inc., Pittsburgh, Pa.
No Drawing. Continuation-in-part of application Ser. No. 887,784, Dec. 23, 1969. This application Aug. 23, 1971, Ser. No. 174,218
Int. Cl. C08g 30/14
U.S. Cl. 260—47 EN        10 Claims

ABSTRACT OF THE DISCLOSURE

Storage-stable, curable epoxy resin compositions comprise a mixture of an epoxy resin and a metal salt complex of an imidazolium salt. Preferably, the composition includes a nitrogenous compound, such as urea, dicyandiamide, melamines or thioureas. These compositions are storage-stable in the uncured state for long periods of time at room temperature, but can be easily cured at elevated temperatures to provide products having excellent sheer strength, peel strength and other properties. These epoxy resin composions can be used as coatings, adhesives, potting compounds, in casting and laminates, and for similar purposes.

CROSS-REFERENCE TO RELATED APPLICATION

This application is a continuation-in-part of our copending application Ser. No. 887,784, filed Dec. 23, 1969, and now abandoned.

BACKGROUND OF THE INVENTION

Many conventional epoxy resin compositions are used by combining the epoxy resin and the curing agent therefor at the time of use. Such two-part systems have been necessary because combinations of an epoxy resin with those curing agents which provide an efficient rate of curing are generally not stable enough to be stored for any appreciable periods. That is, the curing agent, in order to be efficient at elevated temperatures, tends to gel the epoxy resin prematurely at normal room temperatures, or at the temperatures which may be encountered during storage. Thus, it has been necessary to store the epoxy resin and the curing agent separately until the time of usage.

It can be seen that the use of a two-part system is undesirable because of the added expense and inconvenience. A further problem is the difficulty in accurately measuring the components at the time of use, thus making it more likely that the products obtained will have inferior properties. Such problems are especially troublesome with epoxy resin compositions used as coatings or adhesives because of the manner in which such materials are normally utilized in industrial as well as domestic applications.

Imidazoles are known to be efficient curing agents for epoxy resins, and epoxy resins cured with imidazoles yield coatings and adhesives having excellent mechanical properties. However, these curing agents cure epoxies at room temperature and thus their use requires a two-part system with the disadvantages noted above.

It has been recently discovered that certain complexes of imidazoles with metal salts provide storage-stable epoxy resin compositions which can be cured at elevated temperatures. The use of such curing agents, as described in copending applications Ser. Nos. 702,528 and 702,531, both filed Feb. 2, 1968, provide a significant advance in this art and makes possible the utilization of one-part epoxy resin compositions in many applications for which they were not previously suited. However, the metal salt complexes required in those compositions are not always available and in some cases are difficult and expensive to produce. Alternative storage-stable epoxy resin compositions are therefore needed.

SUMMARY OF THE INVENTION

It has now been found that curable epoxy resin compositions which can be stored for extended periods at room temperature but which are easily cured at elevated temperatures are provided by mixtures of an epoxy resin and a metal salt complex of an imidazolium salt of the formula

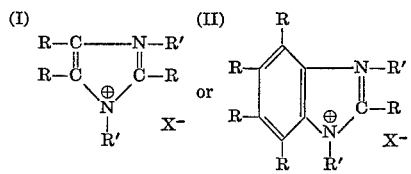

where each R and R' represents hydrogen, alkyl, aryl, or a substituted alkyl or aryl, and X is chloride, bromide, iodide sulfate or phosphate. It is desirable that at least one, and preferably both, of the groups represented by R' are other than hydrogen, i.e. that either or both R' groups are alkyl, aryl or a substituted group. These compositions cure at temperatures of about 350° F. in relatively short times and the products obtained have good properties, including those physical and mechanical properties which enable the compositions to be useful as adhesives and coatings, as well as for potting or casting applications and the like.

It has been further found that curing of these compositions is accelerated by including in the composition certain nitrogenous compounds, preferably a triazine, diazine, triazole, guanidine or guanamine, or a substituted derivative of such compounds.

The epoxy resins to which the invention is applicable includes an epoxy compound or mixture containing one or more oxirane groups. Monoepoxides, as well as polyepoxides, are included, although the preferred epoxy resins are polyglycidyl ethers of polyhydric compounds and other polyepoxides in which the average number of 1,2-epoxy groups per molecule is greater than 1.0.

Essentially any metal salt can be used in forming the complexes utilized, with copper salts, and especially copper halides and nitrate, being preferred.

The amount of metal salt complex ordinarily employed with the epoxy resin can range from about 0.1 to about 20 parts of the metal salt complex per 100 parts of epoxy resin. When a nitrogenous compound is included in the composition, the nitrogenous compound is generally employed in an amount corresponding to about 0.5 to 30 parts per 100 parts of epoxy resin, preferably 5 to 20 parts.

DETAILED DESCRIPTION OF THE INVENTION

The compositions of this invention are epoxy resins blended with a metal salt complex of an imidazolium salt and, optionally, a nitrogenous compound.

Essentially any epoxy resin can be cured in accordance with the invention by mixing the epoxy resin with the organoimidazolium salt and heating the mixture to an elevated temperature, e.g. between about 200° F. and about 500° F. The term "epoxy resin" as used herein refers to any material, monomeric, polymeric or resinous, which contains oxirane groups and which cures to a hard, infusible, thermoset state. The epoxy may be saturated or unsaturated, aliphatic, cycloaliphatic, heterocyclic or aromatic, and may be substituted, if desired, with substituents such as halogens, sulfur, ester groups, urethane groups, hydroxyl groups, mercapto groups, amino groups, ether radicals, acid or acid anhydride groups, ketone or aldehyde groups, or the like. Included are monoepoxides such as propylene oxide, allyl glycidyl ether, phenol glycidyl ether, pentachlorophenyl glycidyl ether, tetrabromophenyl glycidyl ether, glycidyl methacrylate, and the like.

It is preferred, however, that the epoxy resin be a polyepoxide having a 1,2-epoxy equivalency of greater than 1.0, that is, in which the average number of 1,2-epoxy groups per molecule is greater than one. The average number of epoxy groups need not be a whole number and in general is less than four. Such polyepoxides comprise a relatively large class of materials and have been described in numerous patents. Some of these patents are U.S. Pats. Nos. 2,467,171; 2,615,007; 2,716,123; 3,030,336; 3,053,855; and 3,075,999.

Among the polyepoxides which are preferably employed in the present invention are the polyglycidyl ethers of polyphenols such as Bisphenol A. These can be obtained, for example, by etherification of a polyphenol with epichlorohydrin or dichlorohydrin in the presence of an alkali. The phenolic compound may be 2,2-bis(4-hydroxyphenyl)propane, 4,4' - dihydroxybenzophenone, 1,1-bis(4-hydroxyphenyl)-2-methylpropane, 2,2-bis(4-hydroxytertiarybutylphenyl)propane, bis(2 - hydroxynaphthyl)methane, 1,5-dihydroxynaphthalene, or the like. The polyphenol can also be a novolak resin or similar polyphenol resin.

Also suitable are the analogous polyglycidyl ethers of polyhydric alcohols, which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, 2,2-bis(4-hydroxycyclohexyl)propane and the like.

There may also be used polyglycidyl esters of polycarboxylic acids, which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,6-naphthalenedcarboxylic acid, dimerized linolenic acid, or the like. Examples are diglycidyl adipate and diglycidyl phthalate.

The epoxy resin can also be a polyepoxide derived from the epoxidation of an olefinically unsaturated alicyclic compound. Included are diepoxides and higher epoxides, as well as mixtures of epoxides comprising in part one or more monoepoxides. These polyepoxides are non-phenolic and are obtained by epoxidation of alicyclic olefins. This is accomplished, for example, by reaction with oxygen and selected metal catalysts, by perbenzoic acid, by acetaldehyde monoperacetate or by peracetic acid.

Other examples of epoxy resins usable in the invention are epoxidized oils such as epoxidized soybean oil, cycloaliphatic diepoxides, and epoxidized novolak resins obtained by epoxidizing the condensation products of an aldehyde with a polyhydric phenol.

The imidizolium salts which are used to form the metal salt complexes employed with epoxy resins to provide the curable epoxy resin compositions of the invention are compounds of the general formula

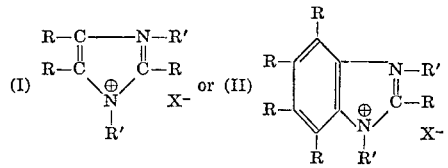

where each R and R' represents hydrogen, alkyl, aryl or substituted alkyl or aryl. R and R' can be, for example, methyl, ethyl, propyl, butyl, hexyl, dodecyl or other alkyl; phenyl or other aryl; benzyl, phenylethyl, or other aralkyl, tolyol, ethylphenyl, or other alkaryl; or other substituted alkyl or substituted aryl, such as 2-carbamylethyl. X in the formula is an anion selected from the group consisting of chloride, bromide, iodide, sulfate, and phosphate.

Some examples of specific imidazolium salts which are used to form metal salt complexes of the class described include the following:

TABLE I 1-methylimidazolium chloride
2-methylimidazolium chloride
1-ethylimidazolium chloride
2-butylimidazolium chloride
1-phenylimidazolium chloride
1-butyl-2-methylimidazolium chloride
1-methyl-3-(methoxymethyl)imidazolium chloride
1-methyl-3-benzylimidazolium chloride
1,2-dimethyl-3-benzylimidazolium chloride
1,3-dibenzylimidazolium chloride
1,3-dibenzyl-2-ethylimidazolium chloride
1,3-dibenzylbenzimidazolium chloride
1-benzyl-2-ethyl-3-(methoxymethyl)imidazolium chloride
1-(2-carbamylethyl)-3-benzylimidazolium chloride
1-(2-carbamylethyl)-2-ethyl-3-benzyl-4-methylimidazolium chloride
1-allyl-2-ethyl-3-benzyl-4-methylimidazolium chloride
1-(2-carbamylethyl)-2-hexylimidazolium bromide
1-butyl-2-methyl-3-hexylimidazolium bromide
1-benzyl-2-ethyl-3-hexylimidazolium bromide
1,3-dimethylimidazolium iodide
1,2,3-trimethylimidazolium iodide
1-methyl-3-pentylimidazolium iodide
1-(2-carbamylethyl)2-ethyl-3,4-dimethylimidazolium iodide
1-benzyl-2-ethyl-3-methylimidazolium iodide
1-(2-carbamylethyl)3-methylimidazolium iodide
1-methylbenzimidazolium iodide
1-methylimidazolium sulfate
1-methylimidazolium phosphate
1,2-dimethylimidazolium sulfate
1,2-dimethylimidazolium phosphate The imidazolium salts employed in the complexes used in the invention are produced by known techniques, such as by alkylation of imidazoles with alkyl halides, and others.

Essentially any metal salt complex of the above imidazolium salts may be used to cure epoxy resins. Thus, any metal salt which forms such a complex can be used. Examples of metal salts include cupric chloride, cuprous chloride, cupric bromide, cupric fluoride, cupric nitrate, cupric fluoroborate, cupric sulfate, cupric acetate, cupric trifluoroacetate, cupric methacrylate, cupric stearate, cupric octoate, cupric malonate, cupric benzoate; nickel salts such as nickel chloride, nickel fluoride, nickel sulfate, nickel fluoroborate, nickel tallate, nickel stearate and castor oil acid salts of nickel; calcium salts such as calcium chloride and calcium bromide; cobalt salts such as cobaltous chloride, cobaltous fluoride, cobaltous sulfate, cobaltous stearate, cobaltous octoate and cobaltous fluoroborate; zinc salts such as zinc bromide, zinc stearate, zinc octoate, zinc 2-ethyl-hexoate, zinc chromate and zinc chloride, mercury salts such as mercuric bromide and mercuric chloride; zirconium salts such as zirconium sulfate; indium salts such as indium fluoroborate; silver salts such as silver nitrate; chromium salts such as chromic chloride; manganese salts such as manganese chloride and manganese sulfate; tin salts such as stannous chloride; cadmium salts such as cadmium chloride; ion salts such as ferrous chloride; titanium salts such as titanium chloride; vanadium salts such as vanadium chloride; antimony salts such as antimony chloride; and the like. Halides and nitrates are among the preferred salts, and copper salts are preferred because they are readily available and easy to use. The metal salts may contain any of the metals in Groups I–B, II–A, II–B, III–A, IV–A, IV–B, V–A, V–B, VI–B, VII–B, and VIII of the periodic Chart of the elements. The Periodic chart may be found in Handbook of Chemistry and Physics, published by Chemical Rubber Publishing Company, 39th edition, on pages 400 and 401.

It is to be understood that the above metal salts are only exemplary of salts which can be utilized, and that other metal salts which form the complexes described may be used.

The metal salt to imidazolium compound molar ratio is not critical. Generally, however, the metal salt to imidazolium salt molar ratio is between about 1:1 and about 1:6; well-defined complexes are formed at a ratio of 2 moles of imidazolium salt per mole of metal salt, and these are preferred.

The complexes of imidazolium salts and metal salts are conveniently formed by mixing the ingredients. If any of the ingredients are solids, solutions of the reactants in a solvent such as methanol or water may be used. If the product is solid, one may filter the resulting precipitate to obtain the complex.

The proportion of the complex employed as the curing agent in the epoxy resin composition is not critical, in that any amount of the curing agent will provide some degree of cure with whatever amount of epoxy material is present. In order to obtain optimum properties, however, various factors must be considered, including the type of epoxy compound, the epoxide equivalent of the epoxy material, the particular complex being employed, and the presence or absence of other additive materials. In most instances, the curable epoxy resin composition contains from about 0.1 to about 20 parts of the metal salt complex per 100 parts of epoxy resin, with the preferred materials containing from about 0.5 to about 15 parts per 100 parts of epoxy resin.

As mentioned above, it is desirable to include in the curable epoxy resin composition a nitrogenous compound which acts as an accelerator. A number of compounds which act in this manner are described in Ser. No. 702,528, filed Feb. 2, 1968 (the disclosure of which is incorporated herein by reference). The surprising increase in curing rate achieved with the use of such nitrogenous compounds with the complexes described in that application has also been found to take place with the curing agents of the present invention. The synergistic effect provided by the use of such compounds with the organoimidazolium salts described above provides curing several times faster than with the imidazolium salt alone, without adversely affecting the storage stability of the composition.

The preferred nitrogenous compounds employed herein are diazines, triazines, triazoles, guanidines, guanamines and alkyl and aryl substituted derivatives of such compounds. Some examples of such compounds are N,N'-dimethylurea,
benzoylurea,
methylolurea,
thiourea,
N,N'-diethylthiourea,
dicyandiamide,
formoguanamine,
acetoguanamine,
benzoguanamine,
ammeline,
guanazole,
carbamylguanazole,
melamine,
2-chloro-4,6-diamino-1,3,5-triazine,
6-methyl-2,4-diamino-1,3,5-triazine,
2-phenyl-4-amino-6-hydroxyl-1,3,5-triazine,
3,5-diaminotriazole,
2,4,6-triaminopyrimidine,
2-mercapto-4,6-diminopyrimidine,
2,4,6-trihydrazine-1,3,5-triazone,
2,4,6-triethylamino-1,3,5-triazine,
3,5-diaminotriazole,
2,4,6-triaminopyrimidine,
2-mercapto-4,6-diaminopyrimidine,
2,4,6-trihydrazino-1,3,5-triazine,
2,4-diamino-1,3,5-thiodiazole, and others of this general class.

Since the use of a nitrogenous compound is optional, it can be employed in any amount to provide some accelerating action. However, when such a compound is utilized, it is commonly present in an amount between about 0.5 and about 20 parts per 100 parts of the epoxy resin.

As indicated, the curable epoxy resin composition is provided by mixing and blending the metal salt complex with the epoxy resin (and the nitrogenous compound, if one is employed). These compositions can be stored at room temperature for relatively long periods, e.g. up to about 4 to 6 months or even longer, and are in many cases even more stable than compositions made from metal salt complexes of imidazoles. At the time of use, the compositions are cured by heating the mixture to about 200° F. to about 500° F.; ordinarily the curing temperature employed is about 350° F. Mixtures of the above metal salt complexes with epoxy resins cure relatively slowly at such temperatures, requiring several hours in many cases and sometimes up to about 24 hours. While in some circumstances this provides an advantage, it is usually desirable to include a nitrogenous compound as described, compositions including such compounds providing very rapid curing, usually in a few minutes, with excellent storage stability.

In addition to the above components there can also be included in the curable composition various additive materials, including pigments, such as titanium dioxide, carbon black and the like; fillers such as aluminum, flexibilizing agents, etc. There can also be included other resinous materials, which may be coreactive with the epoxy resin if desired. Examples include polycarboxylic acid resins, resins containing anhydride groups, polyesters or other resins containing carboxyl, epoxy, hydroxyl or thio groups, silicone resins, urethane resins and amino resins.

The curable compositions of the invention are useful as coatings, adhesives, potting compounds, and castings, and in laminates and reinforced products, and in similar applications. They can be applied on substrates for use as protective or decorative coatings, or as adhesives to bond essentially any solid laminae. They can in general be utilized in any manner in which one-part epoxy materials are useful.

Set forth below are several examples which illustrate the invention and several of its specific embodiments. However, the invention is not to be construed as being limited to these embodiments, for there are, of course, numerous possible variations and modifications. All parts and percentages in the examples, as well as throughout the specification, are by weight unless otherwise indicated.

EXAMPLE 1

A complex was prepared from 31.4 parts of 2-ethyl-1,3-dibenzylimidazolium chloride and 12.1 parts of $Cu(NO_3)_2 \cdot 3H_2O$ by mixing the reactants in methanol and evaporating the solvent. The product was triturated with ethyl acetate, filtered, washed with ethyl acetate and dried. The complex was a yellow-green solid.

This complex was used to cure a typical commercial epoxy resin. The epoxy resin employed was that known as "Epon 828," which is a polyglycidyl ether of Bisphenol A, made by the reaction of epichlorohydrin with Bisphenol A, having an epoxide equivalent of 175 to 210 and an average molecular weight of 350 to 400. The epoxy resin was cured using 5 parts of the metal salt complex per 100 parts of the epoxy resin. Two additional samples were cured in the presence of dicyandiamide, the preferred nitrogenous compound; in one case, 5 parts of the metal salt complex and 20 parts of dicyandiamide were employed per 100 parts of epoxy resin, and in the other 10 parts of the metal salt complex and 20 parts of dicyandiamide. Each of the mixtures was heated at 350° F. and the curing time determined as the time which the resin mixture became hard and impenetrable to a wooden applicator. The results were as follows:

```
                                        Curing time
Metal salt complex alone _____hrs__ 2
With 5 parts metal salt complex _____min__ 5
With 10 parts metal salt complex _____min__ 3
```

EXAMPLES 2–7

Several other metal salt complexes of imidazolium salts were produced in the above manner and their curing efficiency tested as in Example 1. The results are shown in Table I.

TABLE I

| Example | Imidazolium salt | Metal salt | Complex, hours | Complex with 5 parts metal salt complex, minutes | Complex with 10 parts metal salt complex, minutes |
| --- | --- | --- | --- | --- | --- |
| 2 | 1,2-dimethyl-3-benzylimidazolium chloride. | CuCl$_2$ | 4.5 | 9 | 5 |
| 3 | 1-benzyl-2-ethyl-3-methyl-imidazolium chloride. | COCl$_2$ | ¹24 | 6 | |
| 4 | 1-(2-carbamyl-ethyl)-3-hexyl imidazolium bromide. | CuBr$_2$ | 9.5 | 40 | 18 |
| 5 | 1,3-dibenzyl-benzimidazolium chloride. | CuBr$_2$ | 15–23 | 7.5 | 10.5 |
| 6 | 1,3-dibenzyl-benzimidazolium chloride. | Cu(NO$_3$)$_2$ | 12.5 | 7 | 5 |

¹ Minutes.

In each of the foregoing examples, the mixture obtained was quite stable at room temperature and was also stable at 100° F. For example, the stability of the various compositions at 100° F. was found to vary from about 25 days to over 84 days (the maximum time tested); the stability at room temperature was even longer.

In the manner of the foregoing examples, other metal salt complexes are utilized, such as those formed from the imidazolium salts in Table I, reacted with various metal salts as described. Similarly, other epoxy resins are cured using the curing agents described. For instance, among the epoxy resins of various types which can be substituted for that in the above examples are epoxidized novolak resins, such as reaction products of epichlorohydrin with thermoplastic acid-catalyzed phenol-formaldehyde condensates, e.g. the epxoy resin sold as Kopox 356; other polyglycidyl ethers of aliphatic polyols, such as reaction products of epichlorohydrin with ethylene glycol; epoxidized cycloaliphatic compounds, such as 3,4-epoxycyclohexylmethyl 3,4-epoxycyclohexanecarboxylate; epoxidized aliphatic compounds, such as epoxidized polybutadiene; and epoxidized oils, such as epoxidized linseed oil. In addition to dicyandiamide, desirable synergistic effects are obtained with thiourea, and, to a somewhat lesser extent, with urea, diallyl melamine and the other nitrogeneous compounds mentioned.

As mentioned above, the curable epoxy resin compositions of the invention can be used for various purposes. One advantageous use for these materials is as adhesives to bond various materials. They are particularly useful in structural applications wherein they are used to bond metals to each other or to other surfaces; their advantage lies in the extremely high strength of the resulting bonds.

According to the provisions of the patent statutes, there are described above the invention and what are now considered to be its best embodiments. However, within the scope of the appended claims, it is to be understood that the invention can be practiced otherwise than as specifically described.

We claim:

1. A storage-stable curable epoxy resin composition comprising an admixture of an epoxy resin having a 1,2-epoxy equivalence of greater than 1.0 and a metal salt complex of an imidazolium salt of the formula:

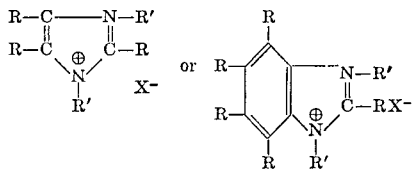

where each R and R' represents hydrogen, alkyl, or aryl, and X is an anion selected from the group consisting of chloride, bromide, iodide, sulfate and phosphate; wherein the metal salt contains a metal selected from Groups I–B, II–A, II–B, III–A, IV–A, IV–B V–A, V–B, V–IB, VII–B, and VIII of the periodic chart of the elements, and wherein the composition contains from about 0.1 to about 20 parts by weight of the metal salt complex per 100 parts by weight of epoxy resin.

2. The composition of claim 1 in which said epoxy resin is polyglycidyl ether of a polyhydric compound.

3. The composition of claim 1 in which at least one of the groups represented by R' is other than hydrogen.

4. The composition of claim 1 in which both groups represented by R' are other, than hydrogen.

5. The composition of claim 1 in which the metal salt is a copper salt.

6. The composition of claim 1 in which said complex contains about 2 moles of imidazolium salt per mole of metal salt.

7. The composition of claim 1 containing as an additional component a nitrogenous compound selected from the group consisting of triazines, diazines, triazoles and guanidines.

8. The composition of claim 7 in which said nitrogenous compound is selected from the group consisting of dicyandiamide, urea, thiourea and diallyl melamine.

9. The composition of claim 7 in which there are present from about 0.5 to about 30 parts of nitrogenous compound per 100 parts of epoxy resin.

10. A cured epoxy resin product produced by heating the composition of claim 7 at a temperature of from about 200° F. to about 500° F.

References Cited

UNITED STATES PATENTS 2,803,609    8/1957    Schlenker.

OTHER REFERENCES

Imidazoles, Preliminary Data Bulletin, Houdry Process, Apr. 8, 1959 (pp. 1–12).

Imidazole, Part I, Hofmann, 1953 (pp. 45, 46).

Handbook of Epoxy Resin, Lee et al. July 1967 (pp. 10–116).

WILLIAM H. SHORT, Primary Examiner

T. E. PERTILLA, Assistant Examiner

U.S. Cl. X.R.

117—161 ZB; 161—184; 252—431 N; 260—2 Ep, 2 N, 2 A, 18 Ep, 37 Ep, 47 Ep, 78.4 Ep, 88.3 A, 94.3, 299, 830 R, 834, 835